United States Patent
Toriihara et al.

(10) Patent No.: US 9,952,439 B2
(45) Date of Patent: Apr. 24, 2018

(54) HEAD MOUNTED DEVICE

(71) Applicant: CANON KABUSHIKI KAISHA, Tokyo (JP)

(72) Inventors: Shigeru Toriihara, Kawasaki (JP); Yuya Nagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/193,603

(22) Filed: Jun. 27, 2016

(65) Prior Publication Data
US 2017/0003508 A1   Jan. 5, 2017

(30) Foreign Application Priority Data
Jun. 30, 2015   (JP) .................. 2015-132191

(51) Int. Cl.
    *G02B 27/01* (2006.01)
(52) U.S. Cl.
    CPC .. *G02B 27/0176* (2013.01); *G02B 2027/0156* (2013.01); *G02B 2027/0169* (2013.01)
(58) Field of Classification Search
    CPC .............. G02B 27/017; G02B 27/0172; G02B 27/0176; G02B 2027/0174; G02B 2027/0178
    See application file for complete search history.

(56) References Cited

U.S. PATENT DOCUMENTS

| | | | | |
|---|---|---|---|---|
| 5,815,126 A * | 9/1998 | Fan | ...... | G02B 27/017 345/7 |
| 5,954,642 A * | 9/1999 | Johnson | ...... | G02B 27/017 600/300 |
| 6,388,640 B1 * | 5/2002 | Chigira | ...... | G02B 27/0176 345/8 |
| 6,421,031 B1 * | 7/2002 | Ronzani | ...... | G02B 27/017 345/8 |
| 6,424,321 B1 * | 7/2002 | Ronzani | ...... | G02B 27/017 345/102 |
| 6,448,944 B2 * | 9/2002 | Ronzani | ...... | G02B 27/017 345/7 |
| 6,452,572 B1 * | 9/2002 | Fan | ...... | G02B 27/017 345/7 |
| 6,677,919 B2 * | 1/2004 | Saito | ...... | G02B 27/0176 345/7 |
| 7,962,972 B2 * | 6/2011 | Nakabayashi | ..... | G02B 27/0176 2/421 |
| 2005/0174470 A1 * | 8/2005 | Yamasaki | ...... | G02B 27/017 348/345 |
| 2013/0188122 A1 * | 7/2013 | Daole | ...... | A45C 11/00 351/158 |

FOREIGN PATENT DOCUMENTS

| JP | 2011-010127 A | 1/2011 |
|---|---|---|
| JP | 2013-200325 A | 10/2013 |

\* cited by examiner

*Primary Examiner* — Gene W Lee
(74) *Attorney, Agent, or Firm* — Canon U.S.A., Inc. IP Division

(57) ABSTRACT

A head mounted device mounted on a user's head includes a display unit that displays an image to the user, a holding member that holds the display unit to the user's head, and an auxiliary member, including a rotation unit, that assists the holding member by rotating about the rotation unit to contact a front of the user's head. The rotation unit includes a biasing member that biases the auxiliary member in a direction of pressing the front region of the user's head and a restricting member that restricts the rotation at the rotation unit.

11 Claims, 5 Drawing Sheets

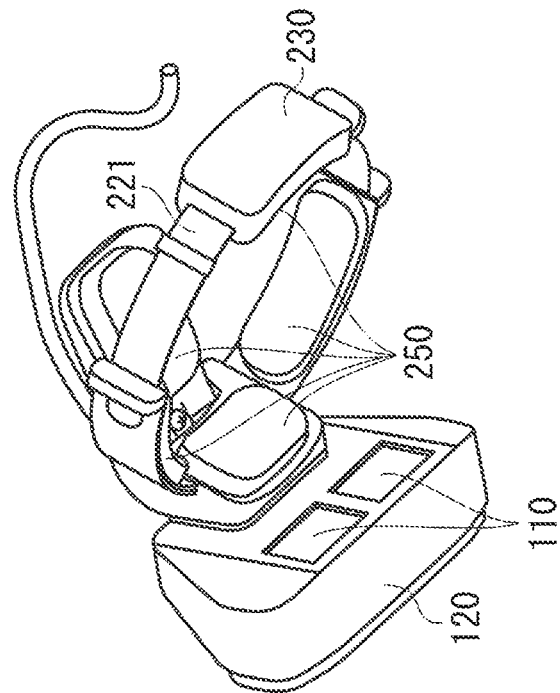
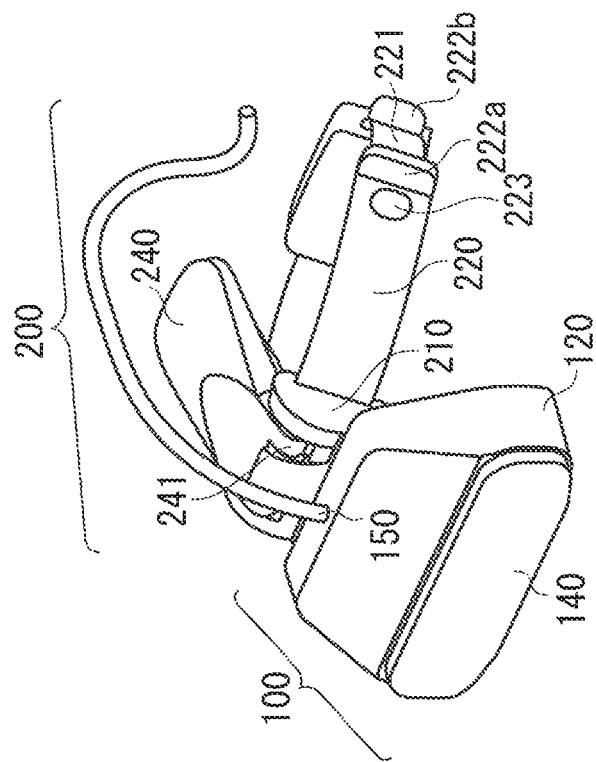
FIG. 1A
FIG. 1B

HEAD MOUNTED DEVICE

BACKGROUND

Field

Aspects of the present invention generally relate to a head mounted device to be mounted on a head of a user.

Description of the Related Art

Head mounted devices are conventionally known that include a display unit that displays an image, and are mounted on a head of a user when used. Such a head mounted device is referred to as a head mounted display (HMD) and can provide an image of a virtual object to a user in motion. Recently, the HMDs have been used in various fields.

A configuration of a general head mounted device, including a display unit, can be roughly divided into the display unit that displays an image to the user and a holding member for securing the display unit to the head of the user. The holding member is required to secure to the head of the user with sufficient tightening force, while be safely and easily removed. The holding member is also required to have a flexible shape that can be modified as appropriate to fit to the head shape of a particular user.

A mechanism for a head mounted device is discussed in Japanese Patent Application Laid-Open No. 2013-200325, which uses a belt as the holding member to satisfy the above requirement(s).

The head mounted device discussed in Japanese Patent Application Laid-Open No. 2013-200325 includes a display unit that displays an image, a belt extending from the display unit to the back of the user's head, and a belt extending from the display unit to the top of the user's head. The two belts prevent the user's head from slipping through a space between the belts and the display unit, and as such, overall stable securement of the head mounted device can be achieved. The belts and length of the belts are independently adjusted which provides sufficient tightening force suited to the shape of a particular user's head.

A mechanism of a head mounted device discussed in Japanese Patent Application Laid-Open No. 2011-010127 employs a pad and a wire member as holding members to satisfy the above requirement(s).

The head mounted device discussed in Japanese Patent Application Laid-Open No. 2011-010127 includes a display unit that displays an image, a wire member extending from the display unit to the back of the user's head, and a pad that contacts a portion around the top of the user's head. The pad prevents the user's head from slipping through a space between the display unit and the wire member, and as such, overall stable overall stable securement of the head mounted device is achieved. The length of the wire member and the protruding amount of the pad toward the top of the user's head are adjustable, which provide sufficient tightening power suited to the shape of a particular user's head. The length of the wire member and the protruding amount of the pad are adjustable in an interlocked manner by operating a knob.

While these conventional head mounted devices provide suitable tightening force/power, a position of an auxiliary member (a belt in Japanese Patent Application Laid-Open No. 2013-200325 or a pad in Japanese Patent Application Laid-Open No. 2011-010127) which assists the holding member, can be difficult to adjust.

For example, when the user wears the head mounted device discussed in Japanese Patent Application Laid-Open No. 2013-200325, the user first roughly adjusts the belts and length of the belts, and then mounts the head mounted device on the user's head. After the head mounted device is mounted, the belts and positions and tightening of the belts are adjusted. In this case, one of the belts might be inappropriately tightened even though the other belt is well positioned and fastened. When this happens, the user needs trial and error to loosen the belts, and to readjust the position and fasten the belts. This can be cumbersome for the user, and hinder appropriate position adjustment.

When the user wears the head mounted device discussed in Japanese Patent Application Laid-Open No. 2011-010127, the knob is operated to adjust tightening of the wire member and a protruding amount of the pad. The positions of the wire member and the pad may not be appropriately adjustable depending on the shape of the user's head.

SUMMARY

Aspects of the present invention are directed to enabling an easy adjustment of a position of an auxiliary member that assists a holding member of a head mounted device to securely hold the head mounted device when mounted on a user's head.

According to an aspect of the present invention a head mounted device to be mounted on a user's head includes a display unit configured to display an image to the user, a holding member configured to hold the display unit to the user's head, and an auxiliary member, including a rotation unit, configured to assist the holding member by rotating about the rotation unit to contact a front region of the user's head. The rotation unit includes a biasing member configured to bias the auxiliary member in a direction of pressing the front region of the user's head and a restricting member configured to restrict the rotation at the rotation unit.

Further features of aspects of the present invention will become apparent from the following description of exemplary embodiments with reference to the attached drawings.

BRIEF DESCRIPTION OF THE DRAWINGS

FIGS. 1A and 1B are each a diagram illustrating an outer view of a head mounted device according to a first exemplary embodiment.

DESCRIPTION OF THE EMBODIMENTS

Figure 2:
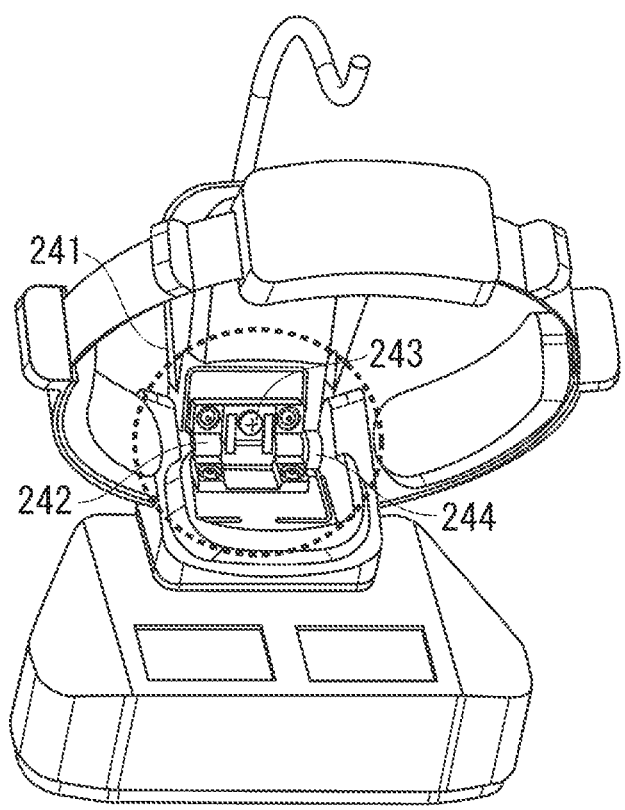
FIG. 2 is a diagram illustrating an internal mechanism of the head mounted device according to the first exemplary embodiment.

A head mounted device according to a first exemplary embodiment is described below.

The head mounted device according to the present exemplary embodiment includes an image capturing unit that can capture an image of a real space and a display unit that displays an image to a user.

The user views scenery in the user's line of sight through the image capturing unit and the display unit.

More specifically, the head mounted device executes the following processing. First, a real space image captured by the image capturing unit is acquired. Then, a virtual object, such as computer graphics, or another real space image is overlapped on the acquired real space image as appropriate. Finally, the display unit provides the image, as a result of the overlapping processing, to the user. A real time image can be displayed to the user if the processing described above is executed fast enough. The head mounted device is suitably used, for example, in product development involving evaluation of parts not actually test-produced, training to prepare for unusual disasters, and entertainment use.

The present exemplary embodiment can be applied to a head mounted device that does not include the image capturing unit and the display unit, but stimulates a non-vision sense organ. For example, the present exemplary embodiment can be applied to a sound guide device that guides a visually impaired user with sounds. The present exemplary embodiment can further be applied to a head mounted device incorporating a main body of a device that artificially produces smells to enhance reality of a virtual object.

FIGS. 1A and 1B each illustrate an outer view of the head mounted device according to the present exemplary embodiment.

FIG. 1A is a perspective view illustrating an outer view of the head mounted device according to the present exemplary embodiment. FIG. 1B is a perspective view illustrating the outer view of the head mounted device as viewed in an angle that is different from that for FIG. 1A. As illustrated in FIG. 1A and FIG. 1B, the head mounted device according to the present exemplary embodiment includes an image capturing/display unit 100 and a head mounted portion 200. The user can see the image capturing/display unit 100 before the user's eyes with the head mounted portion 200 mounted on the user's head without holding the device with the user's hands.

As illustrated in FIG. 1A, the image capturing/display unit 100 includes a front cover 140, a back cover 120, and a cable 150. The image capturing/display unit 100 incorporates an image capturing unit (not illustrated) such as a camera. The front cover 140 is partially formed of a transparent or semitransparent member. The image capturing unit can capture an image of a real space in a line of sight of the user through the front cover 140. The cable 150 supplies power to the image capturing/display unit 100 and enables communication with an external device. In another embodiment, the cable 150 can be omitted when the image capturing/display unit 100 includes a battery, a calculation ability sufficient for image processing, and a wireless communication function.

As illustrated in FIG. 1B, the back cover 120 is disposed on a portion of the display unit 110 of the image capturing/display unit 100. The image capturing/display unit 100 incorporates the display unit 110 that displays an image captured by the image capturing unit and a virtual image. The display unit 110 includes a projection optical system and a reflection optical system as well as a display device. The back cover 120 is partially formed of a transparent or semitransparent member, similar to the front cover 140. The user views the image displayed on the display unit 110 through the back cover 120. Next, a configuration of the head mounted portion 200 will be described.

As illustrated in FIG. 1A, the head mounted portion 200 includes a coupling unit 210, a fixed belt 220 (holding member), a movable belt 221 (holding member), and a front head supporting unit 240 (auxiliary member). The image capturing/display unit 100, the fixed belt 220, and the front head supporting unit 240 are coupled to each other via the coupling unit 210. The image capturing/display unit 100 may be detachably attached to the coupling unit 210 depending on the use. The front head supporting unit 240 is coupled to the coupling unit 210 and is rotatable about a rotational shaft 241 (rotation unit).

As illustrated in FIG. 1B, the head mounted portion 200 includes a back head supporting portion 230 and elastic members 250. The back head supporting portion 230 is coupled to the movable belt 221. The coupling unit 210, the fixed belt 220, the movable belt 221, and the back head supporting portion 230 form a cylindrical space. The user places the user's head into the formed cylindrical space to wear the head mounted device. The elastic members 250 are disposed on surfaces of the coupling unit 210, the fixed belt 220, the movable belt 221, the back head supporting portion 230, and the front head supporting unit 240 that come into contact with the user's head. Elasticity of the elastic members 250 disperses the tightening pressure when the head mounted device is mounted, so that the user's experience of wearing the head mounted device is improved. The material and the shape of the elastic member 250 can be designed as desired, taking into consideration the feeling associated with wearing the head mounted device as well as the overall cleanliness.

FIG. 2 is a diagram illustrating an internal mechanism of the head mounted device according to the present exemplary embodiment. In the figure, the coupling unit 210 is partially cut out so that the internal mechanism incorporated in the rotational shaft 241 is exposed. The rotational shaft 241 includes torque hinges 242 (restricting member) and a double torsion spring 244 (biasing member). The torque hinges 242 restrict rotation with static friction force, so that a spread angle is maintained. Thus, a minor angle around the rotational shaft 241 between the coupling unit 210 and the front head supporting unit 240 cannot be changed as long as no torque exceeding the static friction force of the torque hinges 242 is applied. This static friction force of the torque hinges 242 is referred to as holding force of the rotational shaft 241. The torque hinges 242 may each include an adjustment screw 243 (adjusting member) for adjusting the static friction force. The holding force of the rotational shaft 241 can be adjusted by tightening or loosening the adjustment screw 243. The double torsion spring 244 includes two torsion springs coupled to each other. When the torsion spring is deformed, restoration force based on elastic force for restoring its initial shape acts on the torsion spring. The double torsion spring 244 has an initial shape designed such that the minor angle around the rotational shaft 241 between the coupling unit 210 and the front head supporting unit 240 can be closed (biasing the front head supporting unit 240 in a direction of pressing the front of the head of the user). A force is constantly applied to close the minor angle around the front head supporting unit 240, which is referred to as biasing force of the rotational shaft 241. The biasing force of the rotational shaft 241 is set to be larger than the holding force, regardless of the minor angle between the coupling unit 210 and the front head supporting unit 240. Thus, when the head mounted portion 200 is unmounted, the minor angle between the coupling unit 210 and the front head supporting unit 240 is reduced until the coupling unit 210 and the front head supporting unit 240 come into contact with each other. In other words, the minor angle between the coupling unit 210 and the front head supporting unit 240 automatically returns to a predetermined angle (initial angle). With this configuration, the user does not need to perform an operation of setting the angle between the coupling unit 210 and the front head supporting unit 240 to the initial angle before wearing the head mounted device.

(How to Mount)

How to mount the head mounted device according to the present exemplary embodiment is described. First, the user holds the fixed belt 220 and raises the head mounted portion 200 above the user's head. Then, the user places the user's head into the space formed by the inner sides of the coupling unit 210, the fixed belt 220, the movable belt 221, and the back head supporting portion 230. The user's head then contacts the front head supporting unit 240. At this point, the minor angle between the coupling unit 210 and the front head supporting unit 240 is at the minimum amount because of the relationship between the biasing force and the holding force of the rotational shaft 241. At the time the user's head contacts the front head supporting unit 240, the display unit 110 is not in front of the user's eyes. Next, the user pushes the user's head against the front head supporting unit 240 to apply force that overwhelms the sum of the biasing force and the holding force to the rotational shaft 241. Thus, the minor angle between the coupling unit 210 and the front head supporting unit 240 starts to increase. The user pushes up the front head supporting unit 240 until the user sees the image on the display unit 110. Once the user sees the image on the display unit 110, the user takes their hand off of the fixed belt 220. The sum of the biasing force and the holding force of the rotational shaft 241 is set such that the entire head mounted device can be well supported by the front head supporting unit 240 alone. Even when the user gets removes their hand from the fixed belt 220, the minor angle between the coupling unit 210 and the front head supporting unit 240 does not change, thus maintaining the position of the head mounted device. The front head supporting unit 240 also functions as a head retainer so that the user's head does not slip through the space defined by the inner sides of the coupling unit 210, the fixed belt 220, the movable belt 221, and the back head supporting portion 230.

The user then operates the movable belt 221 that is partially inserted in the fixed belt 220. The fixed belt 220 includes a retainer mechanism 223 which, for example, functions with a craw hooked in a groove or a hole formed in the movable belt 221. The movable belt 221 is further inserted into the fixed belt 220 when a finger holder 222a on the fixed belt 220 and a finger holder 222b on the movable belt 221 receive a force from the user that moves them toward each other. The retainer mechanism 223 prevents the movable belt 221 from being accidentally pulled off from the fixed belt 220. When the user performs an operation on the finger holders 222a and 222b, the coupling unit 210, the fixed belt 220, the movable belt 221, and the back head supporting portion 230 tighten around the user's head. The head mounted portion 200 is secured to the user's head with frictional force associated with the tightening and supporting force of the front head supporting unit 240. The supporting force of the front head supporting unit 240 partially supports the weight of the head mounted portion 200, so that a degree of tightening is alleviated. Through the operation described above, mounting of the head mounted device according to the present exemplary embodiment is completed.

(How to Remove)

Next, how to remove the head mounted device according to the present exemplary embodiment will be described. The retaining provided by the retainer mechanism 223 can be released through a predetermined operation. When the retaining is released through the predetermined operation, the movable belt 221 is pulled out of the fixed belt 220 due to the force acting against the tightening. As a result, the tightening by the head mounting system is relaxed enabling the user's head to be removed from the space defined by the inner sides of the coupling unit 210, the fixed belt 220, the movable belt 221, and the back head supporting portion 230. Through the operation described above, the user can remove the head mounted device according to the present exemplary embodiment.

(Mounted State)

Figure 3A:
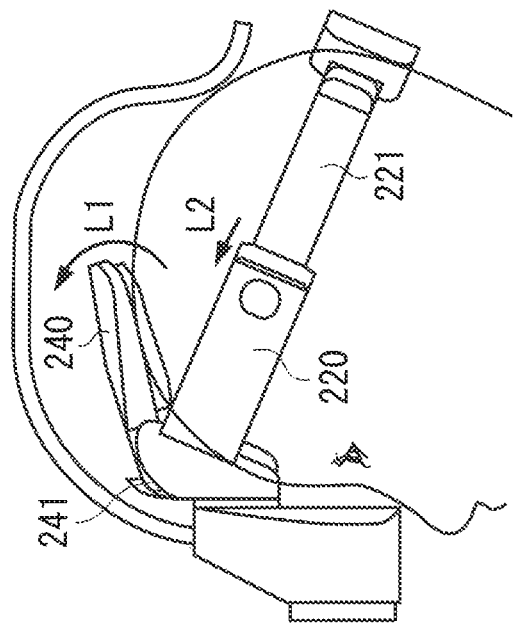
FIGS. 3A and 3B are each a diagram illustrating the head mounted device according to the first exemplary embodiment mounted on a head.
Figure 3B:
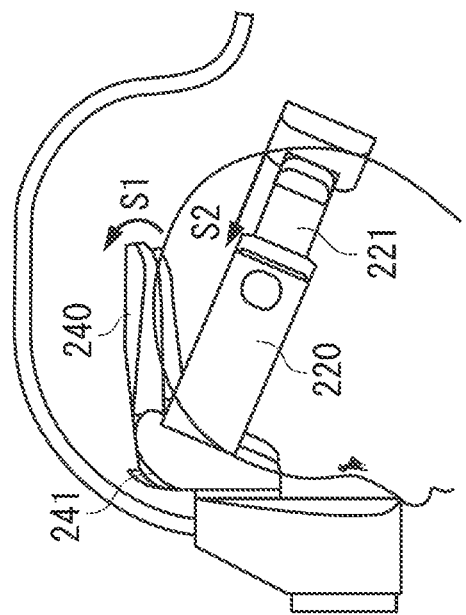

FIGS. 3A and 3B each illustrate a mounted state of the head mounted device according to the present exemplary embodiment.

FIG. 3A is a side view illustrating the head mounted device according to the present exemplary embodiment in a case where the head mounted device is worn by a user with a relatively smaller sized head, such as a woman or child. An amount S1 represents an opened amount of the minor angle between the coupling unit 210 and the front head supporting unit 240 when the user presses the user's head against the front head supporting unit 240. An amount S2 represents an inserted amount of the movable belt 221 into the fixed belt 220 when the finger holders 222a and 222b are operated. FIG. 3B is a side view illustrating the head mounted device according to the present exemplary embodiment in a case where the head mounted device is worn by a user with a relatively larger sized head, such as a grown man. An amount L1 represents an opened amount of the minor angle between the coupling unit 210 and the front head supporting unit 240 when the user presses the user's head against the front head supporting unit 240. An amount L2 represents an inserted amount of the movable belt 221 into the fixed belt 220 when the finger holders 222a and 222b are operated. The amounts S1 and L1 are different from each other and satisfy S1<L1. The amounts S2 and L2 are different from each other and satisfy S2>L2. The minor angle between the coupling unit 210 and the front head supporting unit 240 and the movable range of the movable belt 221 are set accordingly in consideration of such differences. Thus, the head mounted device according to the present exemplary embodiment can be securely mounted regardless of the size and/or shape of the user's head.

Advantageous effects of the head mounted device according to the present exemplary embodiment are now described based on descriptions provided above. The rotational shaft 241 includes the torque hinges 242 and the double torsion spring 244. Thus, sufficient tightening force can be applied from the front head supporting unit 240 to the front of the head of the user wearing the head mounted device. With the torque hinges 242 alone, the positional shift of the front of the user's head cannot be followed. With the double torsion spring 244 alone, the tightening force is too strong for the user to easily wear the head mounted device. With the torque hinges 242 and the double torsion spring 244 disposed together, the sufficient tightening force is generated and the position of an auxiliary member (front head supporting unit 240) can be easily adjusted.

Figure 4:
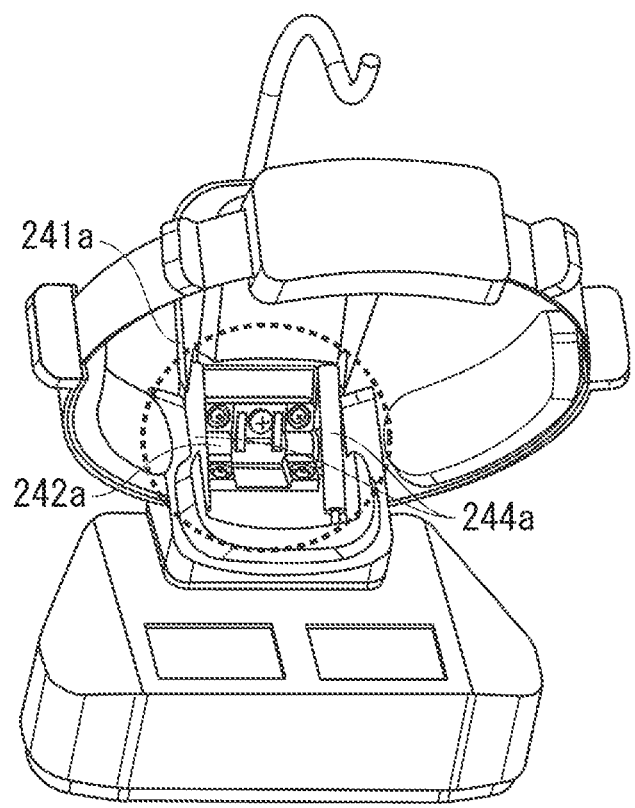
FIG. 4 is a diagram illustrating an internal mechanism of a head mounted device according to a second exemplary embodiment.

FIG. 4 is illustrates an internal mechanism of a head mounted device according to a second exemplary embodiment. A rotational shaft 241a illustrated in FIG. 4 incorporates torque hinges 242a and a tension spring 244a replacing the double torsion spring 244 according to the first exemplary embodiment. Compared with the double torsion spring 244, the tension spring 244a is slightly jutted to the user's head and requires a larger space for extension/contraction stroke. Still, tension springs can be designed to have a smaller spring constant while providing approximately the same elastic force as torsion springs. Thus, compared with the rotational shaft 241, the rotational shaft 241a shows a smaller change in biasing force when the rotational angle is changed. Further, production difference of the spring constant is smaller. Furthermore, a change in the spring constant due to repeated deformation is less. With such advantageous effects, the rotational shaft 241a can provide more efficient biasing force than the rotational shaft 241.

Figure 5:
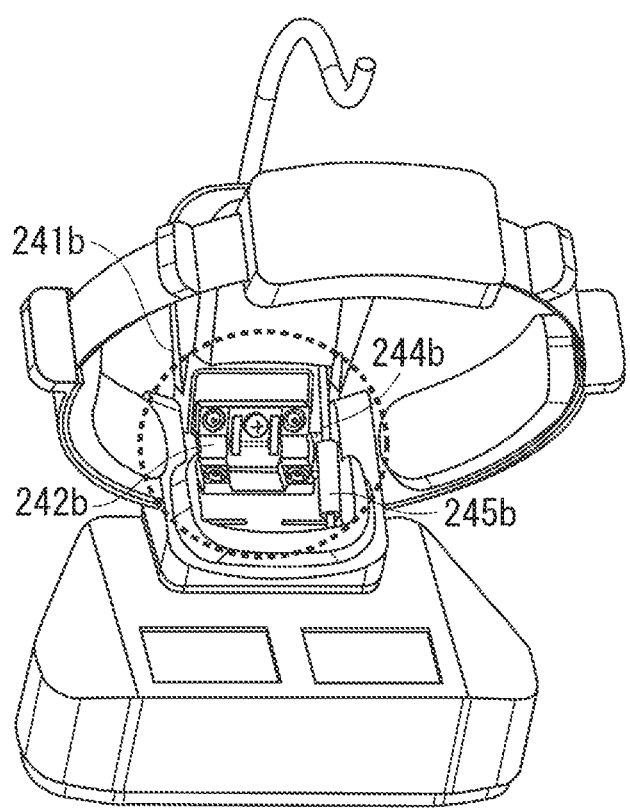
FIG. 5 is a diagram illustrating an internal mechanism of a head mounted device according to a third exemplary embodiment.

FIG. 5 is a diagram illustrating an internal mechanism of a head mounted device according to a third exemplary embodiment. A rotational shaft 241b illustrated in FIG. 5 incorporates a damper 245b in addition to torque hinges 242b and a double torsion spring 244b. The torque hinges 242b produces approximately constant holding force, regardless of a rotation angle of the rotational shaft 241b. The damper 245b, on the other hand, produces a holding force that is approximately proportional to the rotational angular velocity, regardless of the rotation angle of the rotational shaft 241b. For example, when the user wearing the head mounted device including the rotational shaft 241 vertically shakes the user's head extremely fast, an angular velocity overwhelming the holding force of the torque hinges 242 instantaneously acts on the rotational shaft 241, and thus the rotation angle might be changed. On the other hand, when the user wearing the head mounted device including the rotational shaft 241b incorporating the damper 245b shakes the user's head extremely fast in the same manner, the rotation angle of the rotational shaft 241b is less likely to change compared with the rotational shaft 241. This is due to the holding force produced by the damper 245b, which is approximately proportional to the rotational angular velocity.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-132191, filed Jun. 30, 2015, which is hereby incorporated by reference herein in its entirety.

What is claimed is:

1. A head mounted device to be mounted on a user's head, the head mounted device comprising:
a display unit configured to display an image to the user;
a holding member configured to hold the display unit to the user's head; and
an auxiliary member, including a rotation unit, configured to assist the holding member by rotating about the rotation unit to contact a front region of the user's head and a top region of the user's head,
wherein the rotation unit includes a biasing member configured to bias the auxiliary member in a direction of pressing the front region of the user's head and a restricting member configured to restrict the rotation at the rotation unit.

2. The head mounted device according to claim 1, wherein a biasing force of the biasing member is greater than a force of the restricting member restricting the rotation.

3. The head mounted device according to claim 1, further comprising an adjusting member configured to adjust a force, provided by the restricting remember, restricting the rotation.

4. The head mounted device according to claim 1, wherein the biasing member is a torsion spring.

5. The head mounted device according to claim 4, wherein the torsion spring is a double torsion spring including a plurality of torsion springs.

6. The head mounted device according to claim 1, wherein the biasing member is a tension spring.

7. The head mounted device according to claim 1, wherein the restricting member is a torque hinge configured to restrict the rotation with frictional force.

8. The head mounted device according to claim 1, wherein the rotation unit further includes a damper configured to hold a position of the auxiliary member.

9. The head mounted device according to claim 1, wherein an elastic member is disposed at a portion of the head mounted device that contacts the user's head.

10. The head mounted device according to claim 1, further comprising a retaining mechanism configured to secure the head mounted device to the user's head.

11. A head mounted device to be mounted on a user's head, the head mounted device comprising:
a main body configured to stimulate a sense organ of the user's head;
a holding member configured to hold the main body to the user's head; and
an auxiliary member, including a rotation unit, configured to assist the holding member by rotating about the rotation unit to contact a front region of the user's head and a top region of the user's head,
wherein the rotation unit includes a biasing member configured to bias the auxiliary member in a direction of pressing the front of the user's head and a restricting member configured to restrict the rotation at the rotation unit.

* * * * *